US011888955B1

(12) United States Patent
Kaushal et al.

(10) Patent No.: US 11,888,955 B1
(45) Date of Patent: Jan. 30, 2024

(54) CARD ENGINE INTEGRATION WITH BACKEND SYSTEMS

(71) Applicant: T-Mobile USA, Inc., Bellevue, WA (US)

(72) Inventors: Sarvesh Kaushal, Newcastle, WA (US); Rohit Iyer, Redmond, WA (US); Bala Subrahmanya Vivek Kosanam, Issaquah, WA (US); Alexander Clinton Lambert, Issaquah, WA (US); David Bryant Moffett, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/163,185

(22) Filed: Jan. 29, 2021

(51) Int. Cl.
*G06F 15/16* (2006.01)
*H04L 67/567* (2022.01)
*G06Q 20/32* (2012.01)
*H04L 67/63* (2022.01)
*H04L 67/133* (2022.01)
*G06Q 20/34* (2012.01)

(52) U.S. Cl.
CPC ......... *H04L 67/567* (2022.05); *G06Q 20/325* (2013.01); *H04L 67/133* (2022.05); *H04L 67/63* (2022.05); *G06Q 20/352* (2013.01)

(58) Field of Classification Search
CPC ... H04L 67/2838; H04L 67/327; H04L 67/40; G06Q 20/325; G06Q 20/352
USPC ............ 709/219; 705/35, 32, 26, 27; 707/4, 707/638, 802
See application file for complete search history.

(56) References Cited

U.S. PATENT DOCUMENTS

| | | | | |
|---|---|---|---|---|
| 6,721,716 B1 * | 4/2004 | Gross | ................. | G06Q 20/3821 705/40 |
| 8,583,549 B1 * | 11/2013 | Mohsenzadeh | ........ | G06Q 30/02 705/38 |
| 8,626,659 B1 * | 1/2014 | Bowman | ................. | G06Q 20/10 725/23 |
| 9,183,554 B1 * | 11/2015 | Courtright | ............. | G06F 21/36 |
| 9,285,968 B2 | 3/2016 | Schubert et al. | | |

(Continued)

OTHER PUBLICATIONS

Apple Inc., "Business Chat", available at <<https://www.apple.com/ios/business-chat/>>, 2021, 5 pages.

(Continued)

*Primary Examiner* — Thuong Nguyen
(74) *Attorney, Agent, or Firm* — Lee & Hayes, P.C.

(57) ABSTRACT

A client application can be configured to render user interface cards, based on card data provided by a remote card engine. An API Response as Card (ARC) engine can intercept a communication between the client application and the card engine, and determine that the communication is associated with another backend system. The ARC engine can request that the backend system perform an account action associated with a user account. The ARC engine can provide information derived from a response from the backend system, reflecting a result of the account action, to the card engine. The card action can generate card data associated with the result of the account action performed by the backend system, and the client application can use the card data to render and display a corresponding card, even if neither the client application nor the card engine are natively configured to interface with the backend system.

20 Claims, 7 Drawing Sheets

(56) References Cited

U.S. PATENT DOCUMENTS

| | | | |
|---|---|---|---|
| 9,325,807 B1* | 4/2016 | Meoli | B42D 25/00 |
| 9,741,026 B1* | 8/2017 | Grassadonia | G06Q 20/204 |
| 2002/0062285 A1* | 5/2002 | Amann | G06Q 40/04 |
| | | | 705/43 |
| 2002/0152163 A1* | 10/2002 | Bezos | G07F 17/0014 |
| | | | 705/40 |
| 2003/0080186 A1* | 5/2003 | McDonald | G06Q 20/04 |
| | | | 235/380 |
| 2003/0120593 A1* | 6/2003 | Bansal | G06Q 20/10 |
| | | | 705/39 |
| 2004/0088253 A1* | 5/2004 | Crispyn | G06Q 30/04 |
| | | | 705/40 |
| 2004/0123144 A1* | 6/2004 | Chan | H04L 63/0281 |
| | | | 726/8 |
| 2004/0162076 A1* | 8/2004 | Chowdry | H04L 63/0281 |
| | | | 455/445 |
| 2004/0162786 A1* | 8/2004 | Cross | G06F 21/33 |
| | | | 705/59 |
| 2004/0168055 A1* | 8/2004 | Lord | H04L 9/3247 |
| | | | 713/156 |
| 2004/0268306 A1* | 12/2004 | Cheng | G06F 40/143 |
| | | | 717/114 |
| 2006/0169767 A1* | 8/2006 | Moulton | G06Q 20/355 |
| | | | 235/380 |
| 2007/0022019 A1* | 1/2007 | Sherwin | H04L 51/18 |
| | | | 705/26.8 |
| 2007/0226093 A1* | 9/2007 | Chan | G06Q 40/00 |
| | | | 705/35 |
| 2008/0103869 A1* | 5/2008 | Hutty | G06Q 10/063 |
| | | | 705/7.14 |
| 2009/0055266 A1* | 2/2009 | Brody | G06Q 30/0264 |
| | | | 705/30 |
| 2009/0108080 A1* | 4/2009 | Meyer | G06Q 20/102 |
| | | | 235/494 |
| 2009/0125429 A1* | 5/2009 | Takayama | G06Q 20/327 |
| | | | 705/35 |
| 2010/0094671 A1* | 4/2010 | Oaks | G06Q 20/10 |
| | | | 705/39 |
| 2010/0235275 A1* | 9/2010 | Ansley | G06F 8/34 |
| | | | 703/22 |
| 2010/0257210 A1* | 10/2010 | Witkin | G06Q 30/00 |
| | | | 705/26.1 |
| 2010/0299194 A1* | 11/2010 | Snyder | G06Q 30/0211 |
| | | | 705/14.23 |
| 2011/0093397 A1* | 4/2011 | Carlson | G06Q 20/382 |
| | | | 705/67 |
| 2011/0295645 A1* | 12/2011 | Barros | G06Q 10/06316 |
| | | | 709/227 |
| 2012/0203689 A1* | 8/2012 | Parvis | G06Q 40/00 |
| | | | 705/35 |
| 2012/0232981 A1* | 9/2012 | Torossian | G06Q 20/326 |
| | | | 705/26.1 |
| 2013/0041776 A1* | 2/2013 | Schunemann | G06Q 20/20 |
| | | | 705/26.1 |
| 2013/0304559 A1* | 11/2013 | Stone | G06Q 30/0233 |
| | | | 705/14.33 |
| 2014/0136349 A1 | 5/2014 | Dave et al. | |
| 2014/0143145 A1* | 5/2014 | Kortina | G06Q 20/322 |
| | | | 705/44 |
| 2014/0195321 A1* | 7/2014 | Hubbard | G06Q 30/0225 |
| | | | 705/14.49 |
| 2014/0279318 A1* | 9/2014 | Friedman | G06Q 30/04 |
| | | | 705/32 |
| 2014/0324686 A1* | 10/2014 | Dewan | G06Q 20/102 |
| | | | 705/39 |
| 2015/0074183 A1* | 3/2015 | Clothier | H04L 67/1097 |
| | | | 709/203 |
| 2015/0110007 A1* | 4/2015 | Tervo | H04W 28/0263 |
| | | | 370/329 |
| 2015/0127505 A1 | 5/2015 | Parikh | |
| 2015/0339661 A1* | 11/2015 | Li | G06Q 20/38 |
| | | | 705/41 |
| 2016/0027044 A1* | 1/2016 | Sharifi | G06Q 30/0251 |
| | | | 705/14.49 |
| 2016/0063497 A1* | 3/2016 | Grant, IV | G06Q 20/105 |
| | | | 705/44 |
| 2016/0171599 A1* | 6/2016 | Bray | G06Q 30/08 |
| | | | 705/26.3 |
| 2016/0189119 A1* | 6/2016 | Bowman | G06Q 20/3821 |
| | | | 705/39 |
| 2016/0189135 A1 | 6/2016 | Hird et al. | |
| 2017/0116635 A1* | 4/2017 | Gantert | G06Q 30/0226 |
| 2017/0178138 A1* | 6/2017 | Forrest | G06Q 20/4014 |
| 2017/0185724 A1* | 6/2017 | Darling | G06Q 10/10 |
| 2017/0289809 A1 | 10/2017 | Smith et al. | |
| 2017/0300402 A1* | 10/2017 | Hoffner | G06F 11/3664 |
| 2018/0068312 A1 | 3/2018 | Kim et al. | |
| 2019/0080309 A1* | 3/2019 | Goodwin | G06Q 20/401 |
| 2020/0042158 A1* | 2/2020 | Skarda | G06F 3/04883 |
| 2020/0118155 A1* | 4/2020 | Bloy | G06Q 20/227 |
| 2020/0294043 A1* | 9/2020 | Clarke | G06Q 30/02 |
| 2021/0026951 A1* | 1/2021 | Woodworth, Jr. | H04L 63/1416 |
| 2021/0182835 A1 | 6/2021 | Kurylko et al. | |
| 2021/0216998 A1 | 7/2021 | Wadhwa et al. | |
| 2021/0233163 A1 | 7/2021 | Tosmur | |
| 2021/0398100 A1 | 12/2021 | Gabriele et al. | |
| 2022/0058617 A1 | 2/2022 | Tibrewala et al. | |

OTHER PUBLICATIONS

Apple Inc., "Business Chat, Human Interface Guidelines", available at <<https://developer.apple.com/design/human-interface-guidelines/business-chat/overview/introduction/>>, 2021, 2 pages.

* cited by examiner

CARD ENGINE INTEGRATION WITH BACKEND SYSTEMS

BACKGROUND

A client application that executes locally on a user equipment (UE) may be configured to render and display cards in a user interface (UI) based on card data provided by a remote card engine. The card engine may be configured to retrieve account data and other information associated with a user account, and generate corresponding card data that can be sent to the client application. The client application can use the card data to render and display cards in the UI.

For example, when the client application is executed locally on the UE, the client application may be configured to display a card that presents a user's current account balance. The client application may request, from the remote card engine, card data that the client application can use to render and display the card. The remote card engine may retrieve a user's current account balance from a backend database or other source. The remote card engine can generate card data for the card, including card data that reflects the user's current account balance. The remote card engine can transmit the card data over a network to the client application, and the client application can use the card data to locally render and display a card that presents a user's current account balance.

Accordingly, although the client application may not locally maintain current information about the user's account balance, the client application can use card data received from a remote card engine to display the user's current account balance. The client application can similarly display any other type of card with any other type of content, based on card data received from the remote card engine, even if the client application is not pre-configured to store data associated with the content of such cards.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
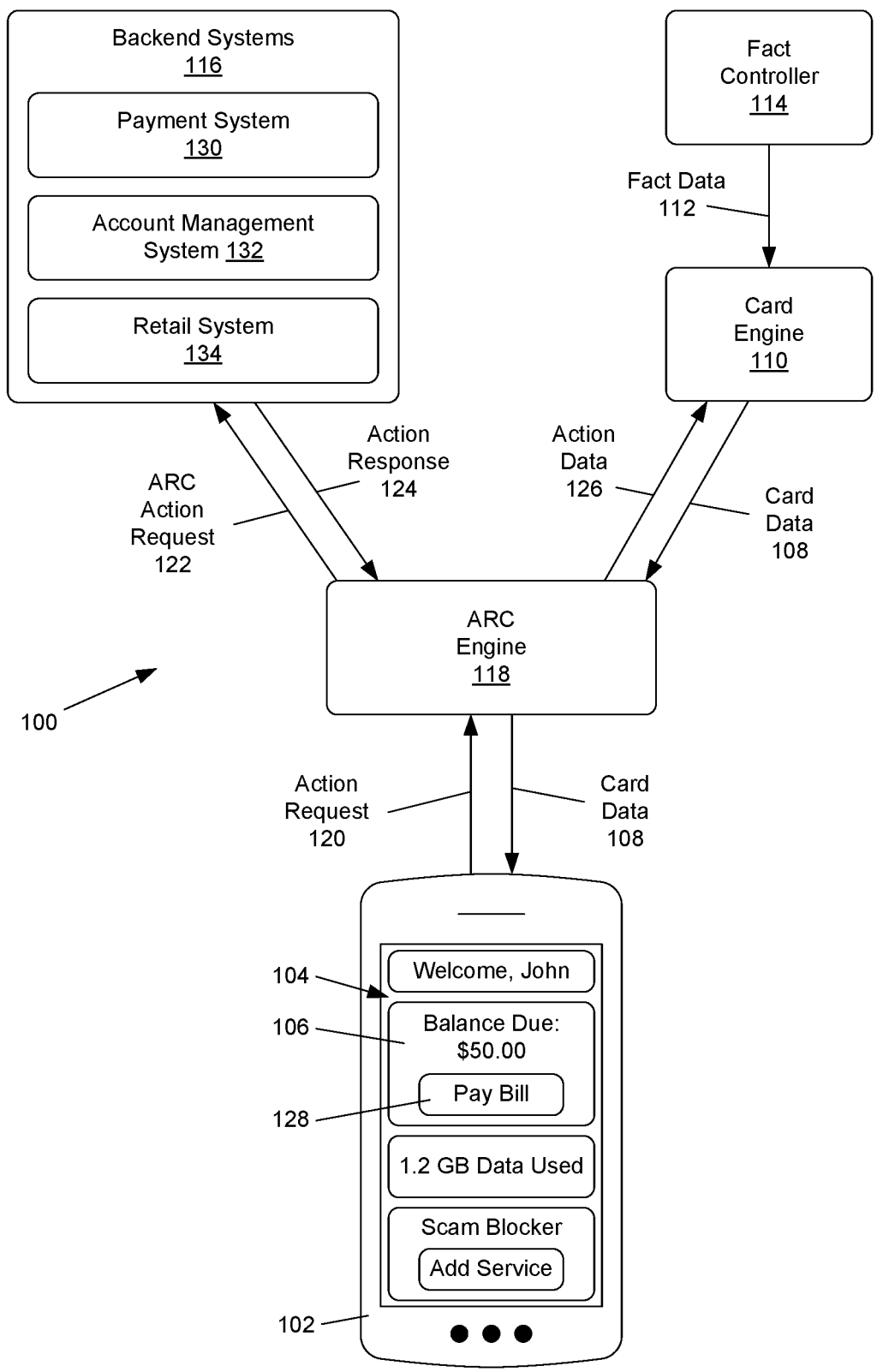
FIG. 1 shows a first example environment in which a UE can locally execute a client application.

A client application that executes locally on user equipment (UE) may have a user interface (UI) that displays one or more cards. Each card can visually present text, images, and/or other content. As an example, the client application may be an account management tool that is associated with a telecommunication service provider, and is configured to display one or more cards that present information about a user's account with the telecommunication service provider. Various types of cards may be displayed in the UI of the client application, such as a card that presents a current account balance, a card that presents monthly data usage information, one or more cards that display account settings, and/or other cards that otherwise allow a user to manage his or her account.

Although the client application can execute locally on the UE, the client application can be associated with a card engine that executes on a different computing device. For example, the card engine can execute on a remote server. The card engine can dynamically generate card data for cards, and can transmit the card data to the client application via a network or other data connection. The client application can use card data, received from the remote card engine, to locally render and/or display corresponding cards in the UI of the client application.

The card engine may be configured to retrieve account data and other information from databases, servers, and/or other backend systems, and use the retrieved information to dynamically generate card data for the client application. As an example, the card engine may be configured to retrieve a current account balance associated with a user. The card engine may then use the retrieved account balance to generate card data for a corresponding card. The card engine can transmit the card data, including the retrieved account balance, to the client application. The client application can use the received card data to locally render a card in the UI that displays the user's current account balance.

The client application can be configured to communicate with the card engine to request and/or receive card data. However, the client application may not be natively configured to communicate with other types of backend systems that can perform account actions. For example, the client application may not be configured to natively communicate with a backend payment system that can make payments associated with user accounts, or to natively communicate with an account management system that can add services to user accounts, make changes to service plans associated with user accounts, or otherwise manage user accounts.

The card engine also may not be configured to natively communicate with other types of backend systems that can perform account actions. For instance, although the card engine may be configured to receive card requests from the client application, fetch relevant account data, and return corresponding card data to the client application, the card engine may not be configured to instruct other backend systems to perform actions associated with a user's account in response to receipt of a card request. For example, the card engine may not be configured to make application programming interface (API) calls to backend systems, such as a backend payment system or a backend account management system, that would cause the backend systems to perform actions associated with a user's account.

In some situations, having the client application communicate primarily with a card engine, that is not configured to instruct other backend systems to perform account actions, can lead to user experience interruptions for users of the client application. For example, the card engine may fetch a current account balance associated with a user's account, and include the account balance as card data sent to the client application. The client application may use the card data to render and display a card in the UI that displays the account balance. In some examples, the card may include a link to pay the account balance. However, because the client application may not be natively configured to communicate with a backend payment system, a user selection of the link in the card to initiate payment of the account balance may cause the UE to launch a separate web browser, window, or other client application through which the user can pay the account balance.

Launching a web browser, window, or other client application, different from the client application that displays cards, can be confusing and/or cumbersome for users. For example, if clicking a link on a card in the client application to pay a bill results in the UE launching a separate web browser and loading a bill payment web page, the user can be taken away from the client application itself. The user may also be asked to log into his or her account on the webpage in order to view the account balance on the webpage and/or pay the account balance via the webpage, even if the user had just been viewing the user's account balance via a card in the UI of the client application. Opening a separate web browser, window, or other client application, different from the client application that displays cards, can also use extra memory, processor cycles, and/or other computing resources on the UE, as well as increase amounts of network traffic sent and received by the UE.

It also may not be desirable to recode or reconfigure the client application to communicate directly with one or more backend systems that can perform account actions. For example, coding the client application to work with APIs of one or more backend systems may increase the memory footprint of the client application on the UE. It may also be difficult to ensure that instances of the client application associated with a userbase are updated consistently in association with new and/or changed backend functions. For instance, if a backend billing system is changed to introduce new features and/or to use different API commands, such a change may require that each instance of the client application on a set of UEs associated with a group of users be updated to become compatible with the new version of the billing system. Ensuring that multiple local instances of the client application are updated to reflect changes to backend systems, and that different instances of the local client applications are updated consistently and/or simultaneously, can be difficult and/or time-consuming.

The client application may also be configured to render card based on a format and/or layout information in a card template. However, it may be inefficient to configure the client application to locally store card templates corresponding to each possible interaction with one or more backend systems. For example, although a backend payment system may successfully process a payment, a payment attempted by such a backend payment system may also fail, or the backend payment system may experience one or more errors. Ensuring that multiple local instances of the client application are updated with card templates for each possible interaction with a set of different backend systems, and that different instances of the local client applications are updated consistently and/or simultaneously with such card templates, can be difficult and/or time-consuming. Storing a large set of card templates locally at the client application can also increase the memory footprint of the client application.

The systems and methods described herein can use an intermediate ARC engine component positioned between the client application and the card engine to intercept requests from the client application to the card engine. If the ARC engine determines that an intercepted request from the client application is a request for a backend system to perform an account action, the ARC engine can request that the backend system perform the account action. The ARC engine can provide a response from the backend system, for instance indicating if the account action was successful, failed, or experienced errors, to the card engine. The card engine can accordingly dynamically generate card data associated with an outcome of the account action that was at least attempted by the backend system. The card engine can provide the card data to the client application, so that the client application can locally render and display a card indicating a success, failure, or any errors associated with the attempted account action. The ARC engine can therefore enable the client application to request account actions by backend systems, and for the card engine to generate card data based on responses from backend systems, even if neither the client application nor the card engine are natively configured to interface with such backend systems. In some examples, the card engine can also use server-side templates to determine a format and/or layout for such cards, including for card data associated with account actions performed by backend systems, such that the client application can avoid storing card templates for every situation that may occur with respect to backend systems.

Example Environment

FIG. 1 shows a first example environment 100 in which a UE 102 can locally execute a client application 104. The UE 102 can be a computing device that has, or can access, a network connection or other data connection. In some examples, the UE 102 can be a mobile phone, such as a smartphone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

The client application 104 can be configured to locally render and/or display at least one card, such as card 106, in a UI of the client application 104. The client application 104 can render and display a card based on corresponding card data 108 generated remotely by a card engine 110. The card engine 110 can execute on a server or other computing device separate from the UE 102. The client application 104 can receive card data 108, generated by the card engine 110, via a network connection or other data connection. The client application 104 can use the received card data 108 to locally render and display corresponding cards as UI elements via the UE 102.

As shown in FIG. 1, in some examples the client application 104 can be an account management tool that is configured to display at least one card associated with a user account for a service or subscription. For instance, the account management tool may be associated with a user account with a telecommunication service provider, utility service provider, media service provider, or any other service provider. In other examples, the client application 104 can be a chat application configured to display cards based on card data 108 generated by the card engine 110, as described below with respect to FIG. 4. In still other examples, the client application 104 can be any other type of application that can locally render and/or display at least one card, based on card data 108 received from a card engine 110.

A card can visually present text, images, and/or other content, as defined by corresponding card data 108. For example, the card 106 may display a current account balance due to be paid by the user, as shown in FIG. 1. The client application 104 may also display one or more other cards. For instance, if the client application 104 is associated with a telecommunication service provider, the client application 104 may display a card welcoming the user to the client application 104, a card that shows how much data the user has used in a current billing period, a card indicating that a service can be added to the user's account, and/or other cards that display other types of information associated with the user's account.

The card engine 110 can dynamically generate card data 108 for one or more cards. In some examples, the card engine 110 may be configured to retrieve information associated with a user's account from other databases, servers, and/or computing elements. As an example, the card engine 110 may be configured to fetch fact data 112 from a fact controller 114 that can store and/or obtain information associated with a user's account. In some examples, the fact controller 114 can obtain account information from one or more other backend systems 116 discussed below, and/or from other databases or sources. The fact data 112 may, for instance, include facts such as the user's first name, the user's last name, the user's current account balance, the user's data usage for the current month, and/or any other fact about the user or the user's account that is available to the fact controller 114. The card engine 110 can retrieve such fact data 112 from the fact controller 114, and use the fact data 112 to dynamically generate card data 108 for one or more types of cards. For instance, if fact data 112 retrieved from the fact controller 114 indicates that the user's first name is "John," the card engine 110 can build card data 108 for a welcome card that displays the text "Welcome, John," as shown in FIG. 1.

In some examples, if fact data 112 retrieved by the fact controller 114 or information received from the client application 104 indicates that a user has set a language preference, the card engine 110 may be configured to dynamically generate card data 108 based on the user's language preference. For example, if the user has set a Spanish language preference, the card engine 110 may build card data 108 for a welcome card that displays the text "Bienvenidos, John," instead of "Welcome, John."

The card data 108 provided by the card engine 110 can indicate card content, such as values for one or more attributes that can be presented via cards. For example, such values may be facts in fact data 112 retrieved by the card engine 110 from the fact controller 114. As will be described in more detail below with respect to FIG. 3, the card data 108 may also indicate card format information, such as a mapping identifier of a card template stored locally by the client application 104 or formatting and/or layout instructions provided by the card engine 110, that the client application 104 can use to render and display card content in a card. In some examples, the card data 108 can be JavaScript Object Notation (JSON) data including one or more attribute-value pairs (AVPs) that define values for attributes. The client application 104 can accordingly use such JSON card data 108 to locally render cards, as native elements of the UI, that display values provided in AVPs of the JSON card data 108. In other examples, the card data 108 can be Extensible Markup Language (XML) data, data expressed in any other data serialization format, or any other type of data that can express card content and/or card format information.

Communications sent between the client application 104 and the card engine 110 can, in some examples, include messages or requests formatted according to Hypertext Transfer Protocol (HTML) GET or POST methods. The communications may, in some examples, also include JSON data, XML data, and/or any other type of data. Such communications can include, for example, requests from the client application 104 for a card, and corresponding card data 108 sent back to the client application 104 from the card engine 110.

In some examples, requests or other communications sent by the client application 104 may also include authentication credentials and/or user account identifiers. For example, communications sent by the client application 104 may include header data or other information identifying a Mobile Station International Subscriber Directory Number (MSISDN) associated with the UE 102 or a user account, authorization tokens or credentials associated with the UE 102 or the user account, and/or other credentials associated with the UE 102 or the user account. In some examples, one or more proxy nodes or servers can be positioned in a network path between the UE 102 and the card engine 110, such as an authorization proxy server that can verify that requests sent by the client application 104 contain valid authentication credentials and can be routed on towards the card engine 110. In some examples, an MSISDN or other user account identifier in a request sent by the client application 104 can be used by the card engine 110 to identify a user account associated with the request and/or to determine which fact data 112 to retrieve about that user account.

Although the card engine 110 may be configured to retrieve account information from the fact controller 114 or other system elements so that the card engine 110 can dynamically generate card data 108, the card engine 110 may not be configured to instruct other backend systems 116 to perform actions associated with a user's account. For example, although the card engine 110 may be able to retrieve fact data 112 about a user's current account balance, and generate corresponding card data 108 for a card that displays the user's current account balance, the card engine 110 may not be configured to use an application programming interface (API) to instruct a separate backend system to process a payment to pay off the user's current account balance. Similarly, although the client application 104 may be configured exchange data with the card engine 110, the client application 104 may not be natively configured to instruct backend systems 116 to perform account actions.

However, an API Response as Card (ARC) engine 118 can be configured to intercept network communications between the client application 104 and the card engine 110, including an action request 120 sent by the client application. The action request 120 may be addressed to the card engine 110 as if it were any other type of request for a card, but may include header data or another type of backend system identifier data that is associated with a particular backend system. If the ARC engine 118 determines that an intercepted network communication is an action request 120 associated with a particular backend system, the ARC engine 118 can transmit a corresponding ARC action request 122 to the identified backend system. The backend system can return an action response 124 to the ARC engine 118. The ARC engine 118 can provide action data 126 to the card engine 110, based on the action request 120 from the client application 104 and/or the action response 124 from the backend system. The card engine 110 can use the action data 126 to dynamically generate new card data 108 for a card to be displayed in response to the action request 120, and the ARC engine 118 can route the new card data to the client application 104.

Accordingly, although neither the client application 104 nor the card engine 110 may be configured to natively communicate with other backend systems, the ARC engine 118 can cause a backend system to perform one or more account actions, and cause the card engine 110 to dynamically generate card data 108 associated with account actions performed by the backend system. Such card data 108 may reflect a successful account action performed by the backend system, a failed account action attempted by the backend system, specific error information associated with a failed account action attempted by the backend system, and/or any other information about the account action at least attempted by the backend system.

In some examples, the ARC engine 118 can be a proxy node or other network element positioned in the network path between the client application 104 and the card engine 110. In some examples, the ARC engine 118 can be positioned in the network path after an authorization proxy server, such that the authorization proxy server can verify that communications from the client application 104 contain valid authorization credentials before forwarding the communications to the ARC engine 118.

In some examples, the ARC engine 118 may maintain a cache of card data 108 previously generated by the card engine 110 in association with a user account. In some situations, the ARC engine 118 may intercept a card request from the client application 104, identify corresponding card data 108 stored in the cache, and return the card data 108 to the client application 104 without passing the card request along with the card engine 110. For example, the card engine 110 may be unlikely to generate a different welcome card for the same user account each time the client application 104 is opened, and may otherwise be configured to generate card data 108 for the "Welcome, John" card shown in FIG. 1 each time the client application 104 is opened. However, the ARC engine 118 may instead provide the client application 104 cached card data 108 for the "Welcome, John" card when the client application 104 requests the welcome card, rather than passing that request on to the card engine 110 and having the card engine 110 re-generate the card data 108 for the "Welcome, John" card.

As noted above, communications intercepted by the ARC engine 118 can also include an action request 120, associated with a particular backend system, sent by the client application 104. Although the client application 104 may have addressed the action request 120 to the card engine 110, the ARC engine 118 can intercept the action request 120, identify which backend system is associated with the action request 120, and route the action request 120 to the identified backend system instead of the card engine 110. The action request 120 can cause the backend system to perform at least one action associated with a user's account. For example, the action request 120 may cause the backend system to add a service to the user's account, remove a service from the user's account, change a service plan associated with the user's account, process a payment associated with the user's account, and/or perform any other account action associated with the action request.

The action request 120 may be sent by the client application 104 in association with a particular card. Some types of cards, such as card 106 shown in FIG. 1, can include a call-to-action (CTA) 128. The CTA 128 can be a user-selectable button, link, image, or other UI element. If the user selects the CTA 128 of a card, the client application 104 can send an action request 120 associated with that card.

The client application 104 may be natively configured to interact primarily with the card engine 110 to request and receive card data 108. Accordingly, the client application 104 may be configured to address outgoing requests associated with cards to the card engine 110, including the action request 120. However, the CTA 128 of the card may cause the client application 104 to include a backend system identifier, such as header data and/or any other data, in the outgoing request that corresponds to a particular backend system associated with the CTA 128. Such header data, or other type of backend system identifier data in the request, can indicate to the ARC engine 118 that the request sent by the client application 104 is an action request 120.

If the ARC engine 118 receives a request from the client application 104, but does not determine that a request includes header data, or any other type of backend system identifier data, that identifies the request as being an action request 120, the ARC engine 118 can forward the request to the card engine 110. However, if the ARC engine 118 determines that a request from the client application 104 does include header data corresponding to a particular backend system, or any other type of backend system identifier data, the ARC engine 118 can identify the request as being an action request 120. The ARC engine 118 can also use the header data, or other type of backend system identifier data, in the action request 120 to identify a particular backend system associated with the action request 120.

The ARC engine 118 can also send an ARC action request 122 to the backend system identified based on the action request 120. The ARC action request 122 can request performance of one or more account actions by the identified backend system, based on the action request 120. The ARC action request 122 may include an MSISDN, account identifier, authentication credentials, or other credentials included in the action request 120, such that the backend system can identify a user account associated with the requested account action.

In some examples, the ARC action request 122 can be a forwarded copy of the action request 120. However, in other examples, the ARC action request 122 can be a copy of the action request 120 that is reformatted to use a particular API associated with the identified backend system, or a new message formatted to use the particular API associated with the identified backend system. For example, the action request 120 may include header data or other backend system identifier data generically requesting payment of a bill associated with a user's account. However, the ARC engine 118 may create a corresponding ARC action request 122 that uses different or more specific API commands or interfaces associated with a backend payment system 130 to request payment of the user's current account balance using a stored payment method.

Backend systems 116 may include a payment system 130, an account management system 132, a retail system 134, and/or other backend systems. Header data or other backend system identifier data in the action request 120 may identify which particular backend system is associated with the action request 120, and thereby allow the ARC engine 118 to determine which backend system should receive a corresponding ARC action request 122.

The payment system 130 may be configured to store payment methods associated with user accounts, process payments associated with user accounts, set up and manage auto-payments for user accounts, and/or perform other payment actions associated with user accounts. Accordingly, the ARC action request 122 may cause the payment system 130 to perform one or more payment actions in association with a particular user account.

In some examples, the payment system 130 may also track payment history data, current balances due, and/or other billing data associated with user accounts. However, in other examples, the account management system 132 may instead track payment history data, current balances due, and/or other billing data associated with user accounts, while the payment system 130 can be configured to process payments associated with user accounts.

The account management system 132 may maintain user account profile information, such as user contact information and data that indicates which service plans and/or individual services the users subscribe to. As discussed above, in some examples the account management system 132 can maintain payment history data, current balances due, and/or other billing data associated with user accounts. The account management system 132 can also be configured to add or remove services from a user's account, change a service plan associated with a user's account, add a telephone line to a user's account, and/or other perform other account-related actions. Accordingly, the ARC action request 122 may cause the account management system 132 to perform one or more account-related actions in association with a particular user account.

The retail system 134 may be configured to perform retail transactions associated with user accounts. For example, the retail system 134 can perform a transaction for a user to purchase a new phone, accessory, or other product in association with the user's account. In some examples, the retail system 134 may allow the user to purchase an item in full, and/or via an installment plan associated with the user's account. Information about such an installment plan for a user account, such as historical data about how much has been paid so far and/or how much is left to be paid, can be stored at the retail system 134, the payment system 130, and/or the account management system 132. The ARC action request 122 may cause the retail system 134 to perform one or more retail transactions in association with a particular user account.

As discussed above, the ARC engine 118 can receive an action request 120 from the client application 104, and send an ARC action request 122 to a corresponding backend system, such as the payment system 130, the account management system 132, the retail system 134, or another backend system. The ARC action request 122 can prompt the backend system to at least attempt to perform one or more actions associated with a user account, such as adding a service, removing a service, changing a service plan, adding an international data pass, paying a bill, setting up auto-payments, purchasing an item, or any other account action.

The backend system can, in response to the action request 120, return an action response 124 to the ARC engine 118 that identifies whether the requested account action was successfully performed, was not successfully performed, whether an error occurred with respect to the account action, and/or any other information about the account action. In some examples, the action response 124 may be formatted or expressed using an API associated with the backend system. The ARC engine 118 may be configured to use the API associated the backend system, and can thus use the API to interpret the action response 124 and/or derive other facts or data from the action response 124.

As a first non-limiting example, if the action request 120 is a request to make a one-time payment associated with a user's account, the ARC engine 118 can send the ARC action request 122 to the payment system 130. In some examples, the ARC engine 118 may format the ARC action request 122 to request the one-time payment using a particular API associated with the payment system 130. If the payment system 130 is able to use a stored payment method to process the one-time payment, the payment system 130 may return an action response 124 to the ARC engine 118 indicating that the one-time payment was successful and/or a new account balance for the user after the one-time payment. However, if the payment system 130 is not able to process the one-time payment, the payment system 130 may return an action response 124 to the ARC engine 118 indicating that the one-time payment could not be processed. The action response 124 may also indicate an error or reason why the one-time payment could not be processed, such as that no stored payment method was found, that a credit card was denied, and/or any other failure message or error message.

As a second non-limiting example, if the action request 120 is a request to add a service to a user's account, such as a scam call blocking service or an international data pass, the ARC engine 118 can send the ARC action request 122 to the account management system 132. In some examples, the ARC engine 118 may format the ARC action request 122 to request that the service be added to the user's account using a particular API associated with the account management system 132. If the account management system 132 is able to add the service to the user's account, the account management system 132 may return an action response 124 to the ARC engine 118 indicating that the service has been successfully added to the user's account. However, if the account management system 132 is not able to add the service to the user's account, the account management system 132 may return an action response 124 to the ARC engine 118 indicating that the user's service plan does not permit the requested service to be added, that an error occurred while attempted to add the requested service, and/or any other failure message or error message.

As a third non-limiting example, if the action request 120 is a request to purchase an item, such as to purchase a new phone or trade-in an existing phone for a new phone, the ARC engine 118 can forward the ARC action request 122 to the retail system 134. In some examples, the ARC engine 118 may format the ARC action request 122 to request the purchase using a particular API associated with the retail system 134. If the retail system 134 is able to successfully perform the retail transaction, the retail system 134 may return an action response 124 to the ARC engine 118 indicating that the retail transaction was successful, that the purchased item will be shipped the user's address, and/or any other information about the successful retail transaction. However, if the retail system 134 is not able to complete the retail transaction, the retail system 134 may return an action response 124 to the ARC engine 118 indicating that the retail transaction could not be completed, that the user's account does not currently permit a phone upgrade, that a stored payment method was unable to be used to make the requested purchase, and/or any other failure message or error message.

The ARC engine 118, in response to receiving an action response 124 from a backend system, can send action data 126 to the card engine 110. The action data 126 can be formatted as fact data 112 that the card engine 110 is configured to interpret and use.

The action data 126 can include one or more facts indicated by the action response 124. For example, if the action response 124 indicates that the requested account action was successfully performed by the backend system, the action data 126 can include a copy of the action response 124 and/or one or more corresponding facts indicating that the account action has been performed successfully. If the action response 124 instead indicates a failure or error associated with the requested account action, the action data 126 can include a copy of the action response 124 one or more corresponding facts indicating the failure or error associated with the requested account action. In some examples, the action data 126 may also include one or more other types of facts associated with the account action, in addition to or instead of a success, failure, and/or error indication. For example, the action response 124 from the backend system may identify a user's first name, the user's last name, a payment amount that was requested and/or processed, a retail item associated with a requested retail transaction, an indication of a requested service change, and/or any other data associated with the user's account or the requested account action. The ARC engine 118 can include such information, indicated in the action response 124, in the action data 126 sent to the card engine 110.

The action data 126 may also include a copy of the action request 120, and/or one or more facts associated with the action request 120. For example, the action data 126 can indicate, to the card engine 110, a type of card that should be returned in response to the action request 120 originally sent by the client application 104. Additionally, if the action request 120 includes a MSISDN, user identifier, and/or other account credentials, the ARC engine 118 can include such credentials, indicated in the action request 120, in the action data 126 sent to the card engine 110.

In some examples, the ARC engine 118 may retrieve fact data 112 from the fact controller 114 about a user account associated with the action request 120. In these examples, the ARC engine 118 can include such fact data 112 in the action data 126 sent to the card engine 110. Including such fact data 112 in the action data 126 sent by the ARC engine 118 to the card engine 110 can allow the card engine 110 to skip fetching the fact data 112 from the fact controller 114 during generation of card data 108. However, in examples in which the ARC engine 118 does not interface with the fact controller 114, the card engine 110 can fetch any relevant fact data 112 from the fact controller 114 when generating card data 108.

The card engine 110 can use facts provided in the action data 126, and/or other fact data 112 retrieved from the fact controller 114, to dynamically generate card data 108 for a new card that is responsive to the action request 120. For example, if the action request 120 was associated with a request to add a service to a user account, and the ARC engine 118 caused the account management system 132 to add that service, the card engine 110 can use corresponding action data 126 to generate card data 108 for a new card that indicates that the service has been added to the user account.

The card engine 110 can send the generated card data 108, through the ARC engine 118, to the client application 104.

The client application 104 can in turn use the new card data 108 to render and display a new card in the UI, as a response to the user selection of the CTA 128 of a previously displayed card.

Figure 2:
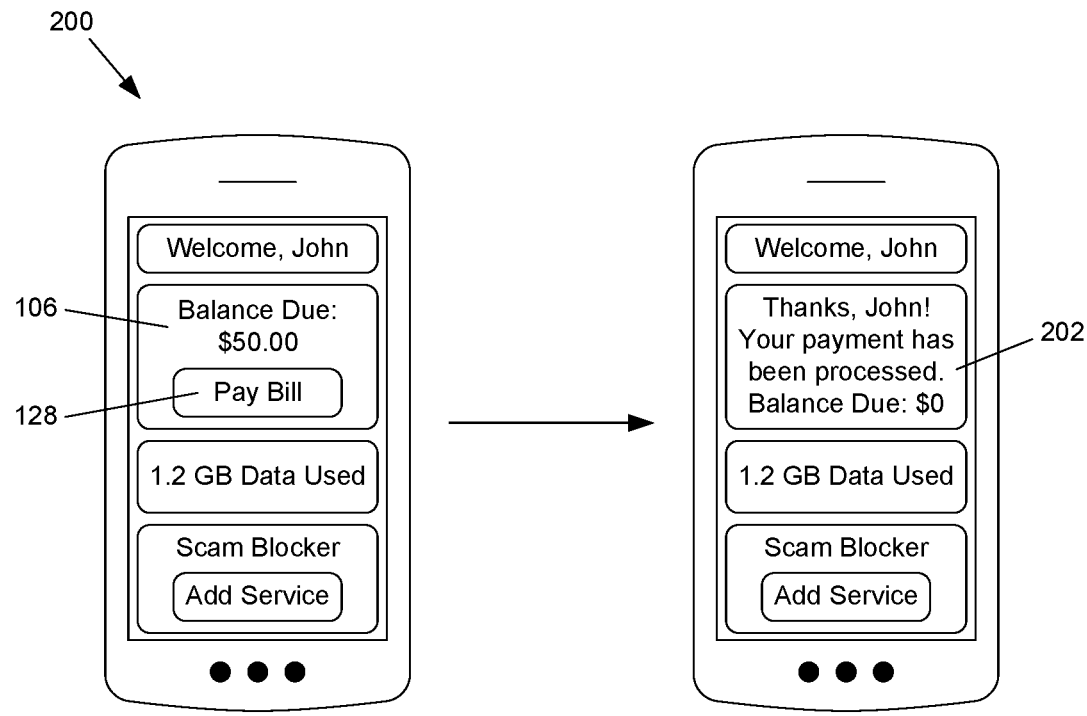
FIG. 2 shows an example in which a user can select a call-to-action (CTA) of a card shown in the user interface of the client application.

FIG. 2 shows an example 200 in which a user can select the CTA 128 of card 106 shown in the UI of the client application 104. The card 106 may display a current balance due for the user's account, and the CTA 128 of the card 106 can display a "pay bill" message indicating the current balance will be paid if the user selects the CTA 128. The card 106, and the corresponding CTA 128, can be rendered and displayed locally based on card data 108 previously provided by the card engine 110 based on fact data 112 associated with the user's account. The card data 108 provided by the card engine 110 for card 106, or the CTA 128 of card 106, can identify a header or another type of backend system identifier associated with the payment system 130.

If the user selects the CTA 128 associated with card 106, the client application 104 can generate and send an action request 120. The action request 120 may be addressed to the card engine 110, but include a header or another type of backend system identifier that identifies the action request 120 as being associated with the payment system 130. The ARC engine 118 can intercept the action request 120, and can determine from the header or other backend system identifier that the action request 120 is associated with the payment system 130. The ARC engine 118 can send an ARC action request 122 to the payment system 130. The payment system 130 may return an action response 124 to the ARC engine 118 indicating that the payment was successfully processed. The ARC engine 118 can send action data 126 to the card engine 110 indicating the successful payment. The card engine 110 can create new card data 108 for a new card 202 that indicates the successful payment, and return the new card data 108, via the ARC engine 118, to the client application 104. The client application 104 can use the new card data 108 to locally render and display the new card 202 in the UI, as shown in FIG. 2. In some examples, the new card 202 can replace the previous card 106 in the UI.

Overall, the client application 104 may be configured to natively interact with the card engine 110, but may not be configured to natively interact with the payment system 130 directly. Similarly, the card engine 110 may not be configured to instruct the payment system 130 to perform a payment operation associated with the user's account. However, based on an action request 120 that the client application 104 addresses to the card engine 110, the ARC engine 118 can send a corresponding ARC action request 122 to the payment system 130 that causes the payment system 130 to process a payment associated with the user's account. In response to an action response 124 from the payment system 130 indicating the successful payment, the ARC engine 118 can send action data 126 that causes the card engine 110 to dynamically generate card data 108 for the new card 202 that reflects the successful payment. Accordingly, without the client application 104 or the card engine 110 being configured to interface directly with the payment system 130, a user can select the CTA 128 of card 106 to initiate a payment, and card 202 can be displayed in the same UI of the client application 104 to confirm that the payment has been made successfully.

Figure 3:
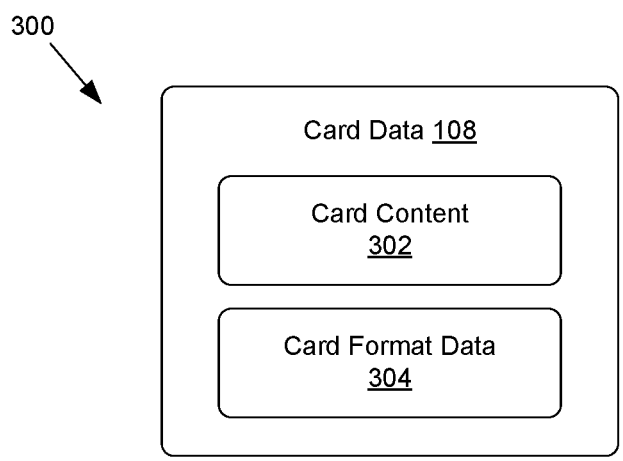
FIG. 3 shows an example of card data that can be generated by a card engine and used by the client application to render a card.

FIG. 3 shows an example 300 of card data 108 that can be generated by the card engine 110 and used by the client application 104 to render a card. The card data 108 can include card content 302 and a card format data 304. The card content 302 can include text, images, and/or other content to be displayed in a card, including content derived from fact data 112 and/or action data 126 as discussed above. The card format data 304 can include a template identifier, or formatting and/or layout instructions, that the client application 104 can use to render the card. For example, the card format data 304 may identify fonts, font sizes, colors, positions of one or more card elements, and/or other format or layout attributes that can instruct the client application 104 how to format and render a card.

In some examples, the card format data 304 in the card data 108 can be a mapping identifier of a local card template stored by the client application 104 locally at the UE 102. For example, the client application 104 may locally store a group of card templates that are each associated with different mapping identifiers. The card format data 304 in the card data 108 may be a mapping identifier of a specific local card template that the client application 104 should use when rendering a card based on the card content 302. For example, the card format data 304 may instruct the client application 104 to use a specific predefined and locally-stored card template to fill in one or more placeholders in the card template with card content 302 provided in the card data 108, format the card content 302 according to format or layout attributes predefined in the locally-stored card template, and/or otherwise use the locally-stored card template to render and display the card.

In other examples, the card format data 304 in the card data 108 can specify format and/or layout indications for one or more elements of card content 302, which define how to render the card content 302 in a card. For instance, in these examples, the client application 104 may not store predefined and/or locally-stored templates. Instead, the card engine 110 may have a repository of server-side templates, and can use any of those server-side templates to generate specific format and/or layout instructions for individual elements of the card content 302. For example, the card engine 110 may provide card data 108 including card content 302 and card format data 304 that together indicate that a card should have a particular word rendered using a particular font, font size, and font color, at a particular position with the card. In some examples, the card data 108 can be JSON or other data that indicates AVPs that identify card content 302, as well as card format data 304 that indicates how to format individual elements of the card content 302.

In some examples, using card format data 304 provided by the card engine 110 in card data 108, rather than predefined card templates stored locally by the client application 104, can reduce a memory footprint of the client application 104 on the UE 102. Additionally, designers can add or change card templates at the card engine 110 so that the card engine 110 can provide corresponding card format data 304 to any instance of the client application 104. This can avoid local updates to individual instances of the client application 104 to provide the individual instances of the client application 104 with local copies of new or updated card templates. In some examples, designers can create server-side templates for any or all possible action responses that backend systems 116 may return to the ARC engine 118. Accordingly, the card engine 110 can use any of these server-side templates to generate card format data 304 for cards associated with any type action response 124 from a backend system, without updating the client application 104 with local copies of all such templates.

As discussed above, the card content 302 can include values for one or more attributes to be rendered and displayed in a card. In some examples, the card content 302 can be provided as JSON data, or other card data 108, that includes one or more AVPs indicating values for one or more attributes.

For example, card content 302 for the card 106 shown in FIG. 1 and FIG. 2 can include a label attribute with a value of "Balance Due" as well as an amount attribute with a value of "$50.00." The "Balance Due" value of the label attribute may be a predefined value selected by the card engine 110, while the "$50.00" value of the amount attribute may be based on fact data 112 retrieved by the card engine 110 from the facts controller 114.

The card data 108 for card 106 may also include card format data 304 that indicates which font, font size, font color, layout positions, and/or other visual attributes to use to render the label attribute and the amount attribute. In some examples, the card format data 304 may identify a locally-stored card template the client application 104 should use to format and/or position the label attribute and the amount attribute. In other examples, the card format data 304 may identify specific layout and/or format data, defined in a card template stored at the card engine 110, for the label attribute and the amount attribute.

The card content 302 for the card 106 may also include a label for the CTA 128 with a value of "Pay Bill," along with a header or other backend system identifier associated with the payment system 130. Accordingly, if a user selects the CTA 128, the card content 302 can instruct the client application 104 to prepare an outgoing request that includes the header or other backend system identifier associated with the payment system 130, which can identify the outgoing request as an action request 120 to the ARC engine 118.

As another example, card content 302 for the card 202 shown in FIG. 2, can include a first label attribute with a value of "Thanks," a second label attribute with a value of "John," a third label attribute with a value of "Your payment has been processed," a fourth label attribute with a value of "Balance Due," and an amount value of "$0." In this example, some of the values may be based on predefined values selected by the card engine 110, and/or based on fact data 112 associated with a user account retrieved by the card engine 110 from the fact controller 114. However, some of the values may be based on action data 126 provided to the card engine 110 by the ARC engine 118, based on an action request 120 and/or a corresponding action response 124. For instance, the "Thanks" label, the "Your payment has been processed" label, and/or the "$0" amount may be based on an action response 124 and/or action data 126 indicating that the payment system 130 successfully processed a payment.

Determining card content 302 and/or card format data 304 at the card engine 110, in response to action data 126, can allow the client application 104 to display cards with almost any content and/or format, without the client application 104 being specially programmed to do so. For example, the client application 104 can use card data 108, provided by the card engine 110 based at least in part on action data 126, to render card 202 showing a successful payment message, even though the client application 104 may not be coded to interact with the payment system 130. The client application 104 also may not be coded to handle various types of situations that may occur with respect to one or more backend systems, but nevertheless use card data 108 to render cards associated with those types of situations.

For example, if a user selects the CTA 128 of card 106 in an attempt to pay a bill, the ARC engine 118 can intercept a corresponding action request 120 and use an ARC action request 122 to instruct the payment system 130 to process that payment. However, if the payment system 130 cannot process the payment, the payment system 130 can return an action response 124 to the ARC engine 118 that indicates a failed payment attempt or a specific error message. The ARC engine 118 can provide a corresponding failed payment indication or error indication to the card engine 110 in action data 126, and the card engine 110 can dynamically generate card data 108 with card content 302 and/or card format data 304 associated with the failed payment or error. For example, upon receipt of action data 126 indicating that a payment attempt failed, the card engine 110 can generate card data 108 that includes a label with a value such as "Sorry, your payment could not be processed." In this situation, the client application 102 can use the card data 108 to render and display a card in the UI that reads "Sorry, your payment could not be processed," instead of the card 202 shown in FIG. 2 that reflects a successful payment. Accordingly, although the client application 104 is not itself configured to handle payment successes, failures, or errors differently, the client application 104 can use card data 108 provided by the card engine 110 to render different cards for payment successes, payment failures, and/or any specific errors that occurred during payment attempts.

The card engine 110 may also be configured to dynamically generate card data 108 based on language preferences or other preferences or settings associated with a user account. For example, action data 126 may indicate that the account management system 132 was successfully able to add an international data pass service to a user's account. The action data 126, or a corresponding action response 124 from the account management system 132, may indicate the successful addition of the international data pass service using one or more English words, a binary value, or any other type of data. However, other data may indicate that user has set a Spanish language preference. For instance, header data in the action request 120, passed along in the action data 126, may reflect a Spanish language preference set by the user locally via settings in the client application 104. Alternatively, fact data 112 retrieved by the card engine 110 may indicate that the user has set a Spanish language preference for his or her account. Accordingly, in response to the action data 126 and according to the user's Spanish language preference, the card engine 110 can generate card data 108 with card content 302 expressed in the Spanish language. For instance, instead of including a value of "Thank you" in a label of the card content 302, the card engine 110 may instead a value of "Gracias" in that label of the card content 302. The client application 104 can therefore use the card data 108 to render and display a card that uses Spanish to express the successful addition of the international data pass service, even if the client application 104 and/or the account management system 132 is not natively configured to use the Spanish language.

Figure 4:
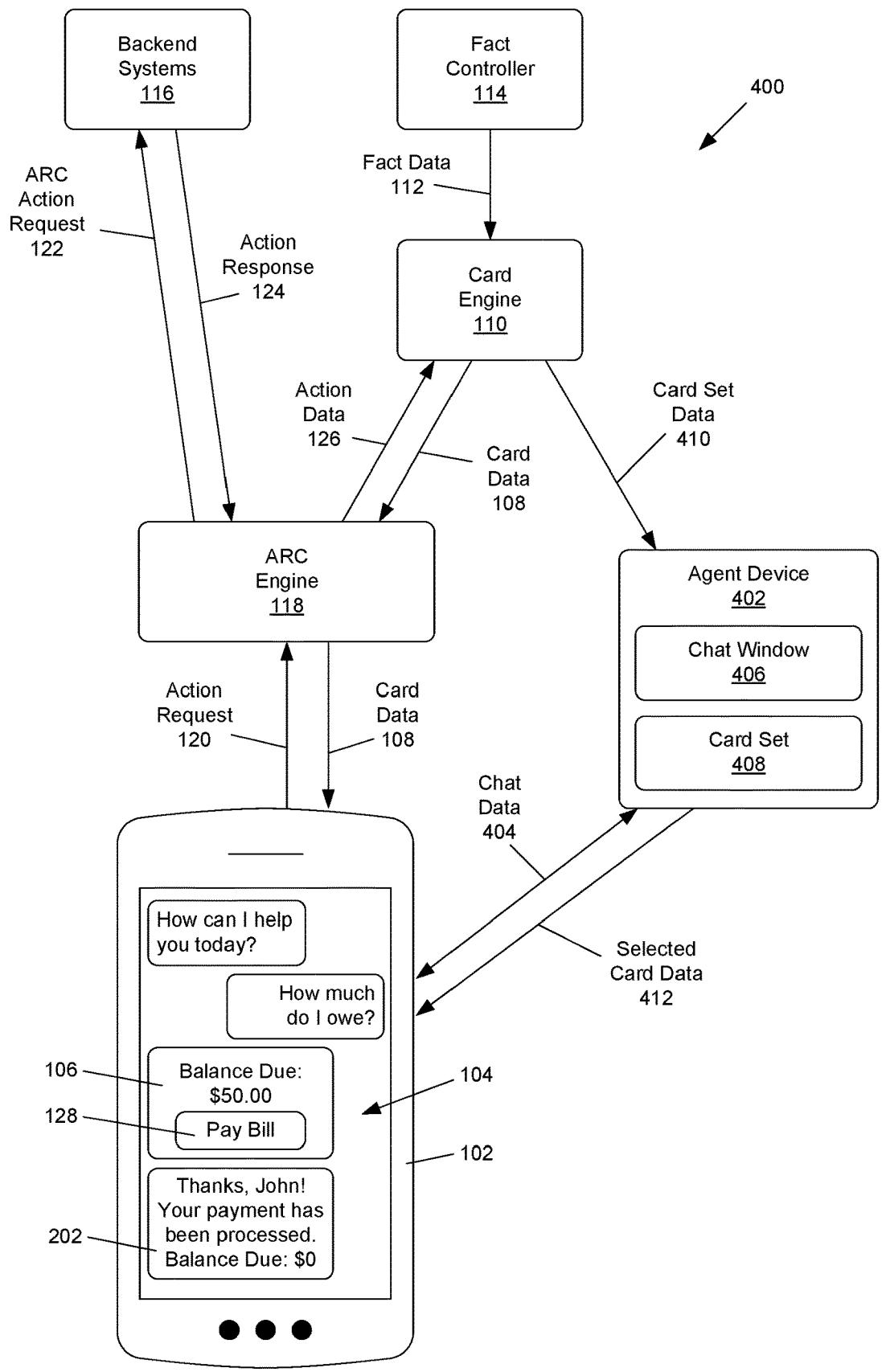
FIG. 4 shows a second example environment in which the client application is a chat application configured to display cards selected remotely at an agent device.

FIG. 4 shows a second example environment 400 in which the client application 104 is a chat application configured to display cards selected remotely at an agent device 402. The agent device 402 can be a computing device that can engage, via a network connection or other data connection, in a chat session with the client application 104 executing on the UE 102. For example, the client application 104 and the agent device 402 can exchange chat data 404 associated with the chat session, such as text, images, and/or other data. In some examples, the agent device 402 may be configured to display a chat window 406 that displays text, images, and/or other data associated with the chat session to a customer service agent. In other examples, the agent device 402 may have a chat bot or other automated chat agent that uses artificial intelligence, language analysis, and/or other automated chat functions to automatically generate responses to user message or select between pre-prepared responses. In some examples, the agent device 402 can be a PC, such as a laptop, desktop, or workstation. In other examples, the agent device 402 can be a mobile phone, a tablet computer, or any other type of computing or communication device.

In some examples, the client application 104 can be an Apple® iMessage® application that uses Apple Business Chat® to engage in a chat session with the agent device 402, o. Via Apple Business Chat®, iMessage® can be configured to render and display one or more cards, such as card 106, selected via the agent device 402. In other examples, the client application 104 can be any other type of chat client, such as a chat client that executes in association with a website, that is configured to display cards selected via the agent device 402.

The agent device 402 may have a card set 408. The card set 408 can include a group of different cards, based on card set data 410 generated by the card engine 110. In some examples, the card engine 110 may send the card set data 410 directly to the agent device 402. In other examples, the card engine 110 may send the card set data 410 to the agent device 402 via the ARC engine 118. In some examples, the agent device 402 may use the card set data 410 to render and display the group of different cards to a customer service agent via a UI. In other examples, an automated chat agent may have access to the group of different cards based on the card set data 410.

The card set data 410 provided to the agent device 402 can include card data for the card set 408, based on fact data 112 that the card engine 110 retrieves from the fact controller 114 and/or other sources. For example, when the agent device 402 initiates the chat session with the client application 104 in association with a user account, the agent device 402 may request card set data 410 for the card set 408 from the card engine 110. The card engine 110 can fetch corresponding fact data 112 associated with the user account from the fact controller 114, and dynamically generate card data 108 for multiple types of cards. For example, the card engine 110 can generate first card data for a first card that presents an account balance, second card data for a second card that presents an amount of mobile data used so far in the current month, third card data for a third card that presents an amount of telephone minutes used in in the current month, and/or other types of card data for other cards. The card engine 110 can send the various types of card data as card set data 410 to the agent device 402. The agent device 402 can use the card set data 410 to render and display the corresponding group of cards as part of the card set 408 visible to a customer service agent via a UI at the agent device 402, or otherwise prepare the card set 408.

In examples in which the agent device 402 is operated by a customer service agent, the agent device 402 can use the card set data 410 to render and display the card set 408, containing a group of pre-prepared cards, to the customer service agent. As the chat session progresses, the customer service agent may have the option to select any of the pre-prepared cards in the card set 408. For example, if the user asks a question during the chat session, the customer service agent may have the option of selecting one of the cards from the card set 408 that the customer service agent believes is relevant to the user's question. Selection of a pre-prepared card in the card set 408 can cause the agent device 402 to send corresponding selected card data 412, including card data 108 originally generated by the card engine 110 for the selected card, to the client application 104. The client application 104 can use the selected card data 412 to locally render and display the card selected by the customer service agent within chat data displayed via the UE 102 to a user of the client application 104.

As a non-limiting example, the card set 408 shown via the agent device 402 during a chat session with a user may include card 106, which as discussed above with respect to FIG. 1 and FIG. 2 may present the user's current account balance and a CTA 128 associated with an instruction to pay the user's current account balance. The card set 408 shown via the agent device 402 may also include one or more other cards, such as cards that display data usage statistics or other information retrieved by the card engine 110. If the user asks a question during the chat session, such as "How much do I owe?," the customer service agent can select the card 106 from the card set 408 because the pre-prepared card 106 answers the user's question. Accordingly, the customer service agent can avoid taking time and effort to look up the user's current account balance and manually typing a response.

In other examples in which the agent device 402 is associated with a chat bot or other automated chat agent, the automated chat agent may similarly send selected card data 412 to the client application. For example, the agent device 402 may evaluate a message received from the user during the chat session, determine that a pre-prepared card in the card set is relevant to the user's message, and respond by sending corresponding selected card data 412 as a response to the user's message.

If a card with a CTA 128 is rendered and displayed as part of a chat session via the client application 104, based on a selection of that card at the agent device 402, the user may optionally select the CTA 128 as discussed above with respect to FIG. 1 and FIG. 2. Selection of the CTA 128 can cause the client application 104 to generate and send an action request 120 that includes a header or other backend system identifier associated with the CTA 128 and/or a corresponding backend system.

As discussed above, although the action request 120 may be addressed to the card engine 110, the ARC engine 118 can intercept the action request 120 and use the header or other backend system identifier to identify the corresponding backend system. The ARC engine 118 can generate and send a corresponding ARC action request 122 to the identified backend system that requests that the identified backend system perform an account action associated with the user's account. The backend system can attempt to perform the account action, and return an action response 124 to the ARC engine 118 indicating a success, failure, or error associated with the account action. The ARC engine 118 can include information from the action request 120 and/or the action response 124 in action data 126 sent to the card engine 110. The card engine 110 can then use the action data 126 and/or fact data 112 to dynamically generate card data 108 that reflects the success or failure of the account action attempted by the backend system, and/or any corresponding errors. The card engine 110 can return the card data 108, via the ARC engine 118, to the client application 104. The client application 104 can use the card data 108, using a local template or layout and/or format information included in the card data 108, to render and display a card in the UI of the client application 104 that reflects the success or failure of the account action attempted by the backend system, and/or any corresponding errors.

For example, if the user selects the CTA 128 of card 106 in the chat window displayed in the UI of the client application 104, the client application 104 can send an action request 120 that is addressed to the card engine 110, but includes a header identifying the payment system 130. The ARC engine 118 can intercept the action request 120, and instruct the payment system 130 to process a payment for the user. If the payment system 130 successfully processes the payment, the ARC engine 118 can indicate that success to the card engine 110, and the card engine 110 can dynamically generate card data 108 for card 202 that reflects the successful payment. The client application 104 can use the card data 108 generated by the card engine 110 to render and display card 202 in the chat window, as shown in FIG. 4. Accordingly, the user can interact with card 106 within the chat session to cause a payment to be processed, instead of being provided with a website link to a payment webpage that might open a separate web browser and/or take the user away from the chat session.

Example Architecture

Figure 5:
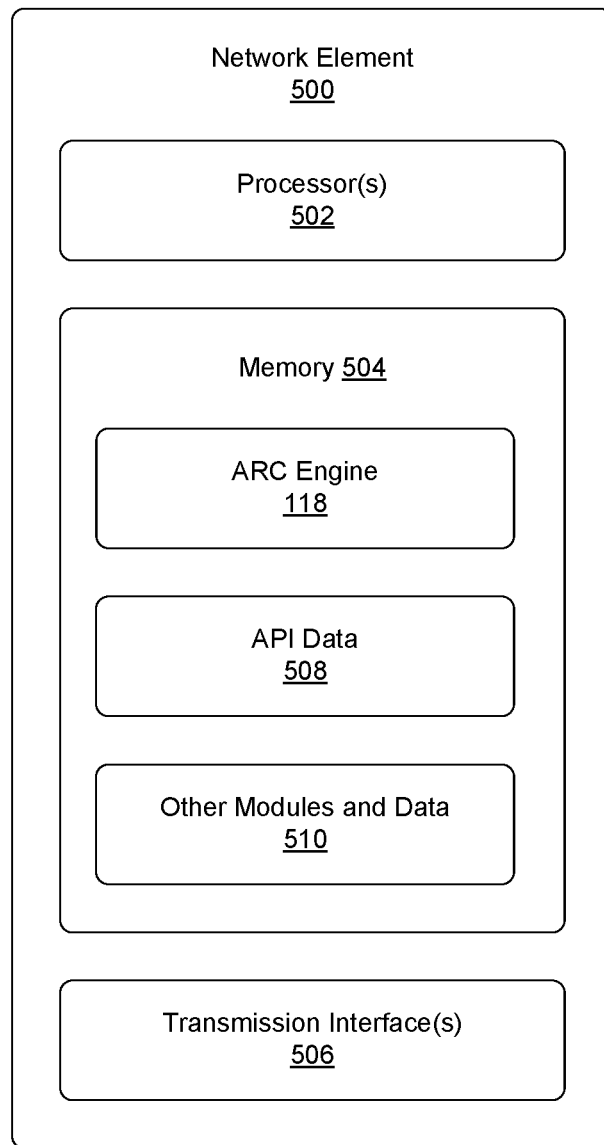
FIG. 5 shows an example system architecture for a network element configured to execute an API Response as Card (ARC) engine.

FIG. 5 shows an example system architecture for a network element 500 configured to execute the ARC engine 118, in accordance with various examples. As shown, the network element 500 can include processor(s) 502, memory 504, and transmission interface(s) 506. In some examples, the network element 500 can be distinct hardware for the ARC engine 118. However, in other examples, the network element 500 can be a server or other computing device that executes the ARC engine 118 as a software application or executes a virtual instance of the ARC engine 118. In some examples, the network element 500 may also execute an instance of the card engine 110 as a separate application or component than the ARC engine 118. However, as discussed below with respect to FIG. 6, in other examples a different network element 600 may execute the card engine 110 while the network element 500 executes the ARC engine 118.

In various examples, the processor(s) 502 can be a CPU, a GPU, both CPU and GPU, or any other type of processing unit. Each of the one or more processor(s) 502 may have numerous ALUs that perform arithmetic and logical operations, as well as one or more CUs that extract instructions and stored content from processor cache memory, and then executes these instructions by calling on the ALUs, as necessary, during program execution. The processor(s) 502 may also be responsible for executing all computer-executable instructions and/or computer applications stored in the memory 504.

In various examples, the memory 504 can include system memory, which may be volatile (such as RAM), non-volatile (such as ROM, flash memory, etc.) or some combination of the two. The memory 504 can also include additional data storage devices (removable and/or non-removable) such as, for example, magnetic disks, optical disks, or tape. Memory 504 can further include non-transitory computer-readable media, such as volatile and nonvolatile, removable and non-removable media implemented in any method or technology for storage of information, such as computer-readable instructions, data structures, program modules, or other data. For example, the memory 504 can store software or firmware elements, such as computer-readable instructions that are executable by the one or more processors 502. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by the network element 500. Any such non-transitory computer-readable media may be part of the network element 500.

The memory 504 can store computer-readable instructions and/or other data associated with operations of the network element 500, including operations of the ARC engine 118. For example, the memory 504 can store API data 508 associated with one or more backend systems 116, which the ARC engine 118 can use to format ARC action requests 122 for the backend systems 116 and/or to interpret action responses 124 from the backend systems 116. The memory 504 can further store other modules and data 510, which can be utilized by the network element 500 to perform or enable performing any action taken by the network element 500. The modules and data 510 can include a platform, operating system, firmware, and/or applications, and data utilized by the platform, operating system, firmware, and/or applications.

The transmission interface(s) 506 can include one or more modems, receivers, transmitters, antennas, error correction units, symbol coders and decoders, processors, chips, application specific integrated circuits (ASICs), programmable circuit (e.g., field programmable gate arrays), firmware components, software components, and/or other components through which the ARC engine 118 can send data to, and/or receive data from, other network elements and/or the UE 102. For example, the network element 500 can use transmission interface(s) 506 to receive an action request 120 from the UE 102, send an ARC action request 122 to a backend system, receive an action response 124 from the backend system, send action data 126 to the card engine 110, receive card data 108 from the card engine 110, and/or forward the card data 108 to the UE 102.

Figure 6:
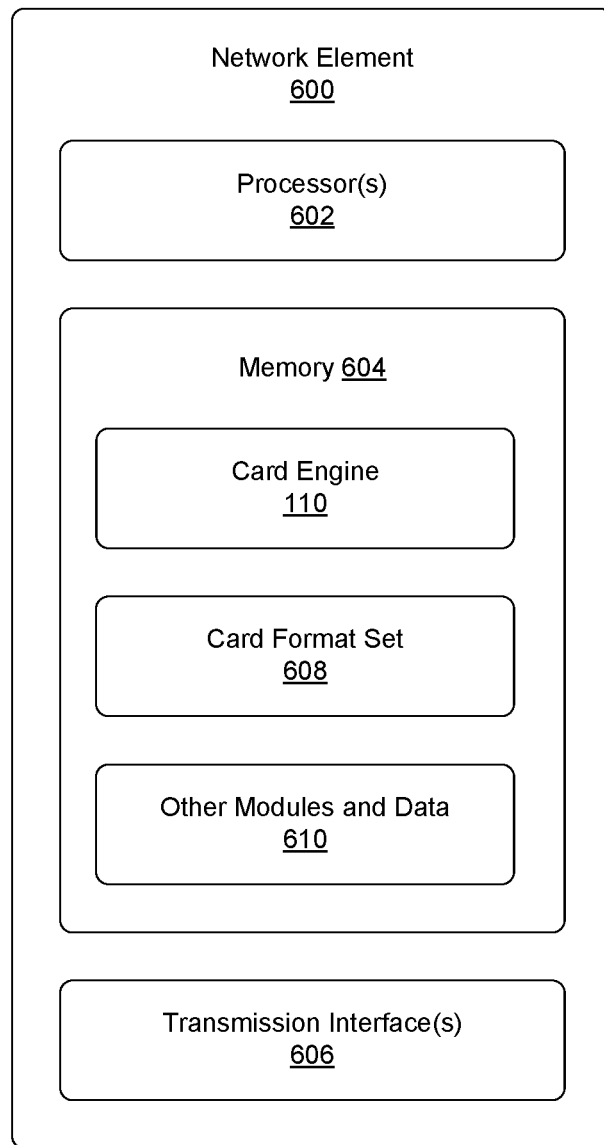
FIG. 6 shows an example system architecture for a network element configured to execute the card engine.

FIG. 6 shows an example system architecture for a network element 600 configured to execute the card engine 110, in accordance with various examples. As shown, the network element 600 can include processor(s) 602, memory 604, and transmission interface(s) 606. In some examples, the network element 600 can be distinct hardware for the card engine 110. However, in other examples, the network element 600 can be a server or other computing device that executes the card engine 110 as a software application or executes a virtual instance of the card engine 110. In some examples, the network element 600 may also execute an instance of the ARC engine 118 as a separate application or component than the card engine 110. However, as discussed above with respect to FIG. 5, in other examples a different network element 500 may execute the ARC engine 118 while the network element 600 executes the card engine 110.

In various examples, the processor(s) 602 can be a CPU, a GPU, both CPU and GPU, or any other type of processing unit. Each of the one or more processor(s) 602 may have numerous ALUs that perform arithmetic and logical operations, as well as one or more CUs that extract instructions and stored content from processor cache memory, and then executes these instructions by calling on the ALUs, as necessary, during program execution. The processor(s) 602 may also be responsible for executing all computer-executable instructions and/or computer applications stored in the memory 604.

In various examples, the memory 604 can include system memory, which may be volatile (such as RAM), non-volatile (such as ROM, flash memory, etc.) or some combination of the two. The memory 604 can also include additional data storage devices (removable and/or non-removable) such as, for example, magnetic disks, optical disks, or tape. Memory 604 can further include non-transitory computer-readable media, such as volatile and nonvolatile, removable and non-removable media implemented in any method or technology for storage of information, such as computer-readable instructions, data structures, program modules, or other data. For example, the memory 604 can store software or firmware elements, such as computer-readable instructions that are executable by the one or more processors 602. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by the network element 600. Any such non-transitory computer-readable media may be part of the network element 600.

The memory 604 can store computer-readable instructions and/or other data associated with operations of the network element 600, including operations of the card engine 110. In some examples, the memory 604 can store a card format set 608 that includes a group of server-side templates defining layouts and/or formats for cards. The card engine 110 may use the card format set 608 to select a particular server-side template for a card, and include card format data 304 based on the selected server-side template along with card content 302 in card data 108. The memory 604 can further store other modules and data 610, which can be utilized by the network element 600 to perform or enable performing any action taken by the network element 600. The modules and data 610 can include a platform, operating system, firmware, and/or applications, and data utilized by the platform, operating system, firmware, and/or applications.

The transmission interface(s) 606 can include one or more modems, receivers, transmitters, antennas, error correction units, symbol coders and decoders, processors, chips, application specific integrated circuits (ASICs), programmable circuit (e.g., field programmable gate arrays), firmware components, software components, and/or other components through which the card engine 110 can send data to, and/or receive data from, other network elements. For example, the network element 600 can use transmission interface(s) 506 to retrieve fact data 112 from the fact controller 114, receive action data 126 from the ARC engine 118, and/or send card data 108 to the UE 102 via the ARC engine 118.

Example Operations

Figure 7:
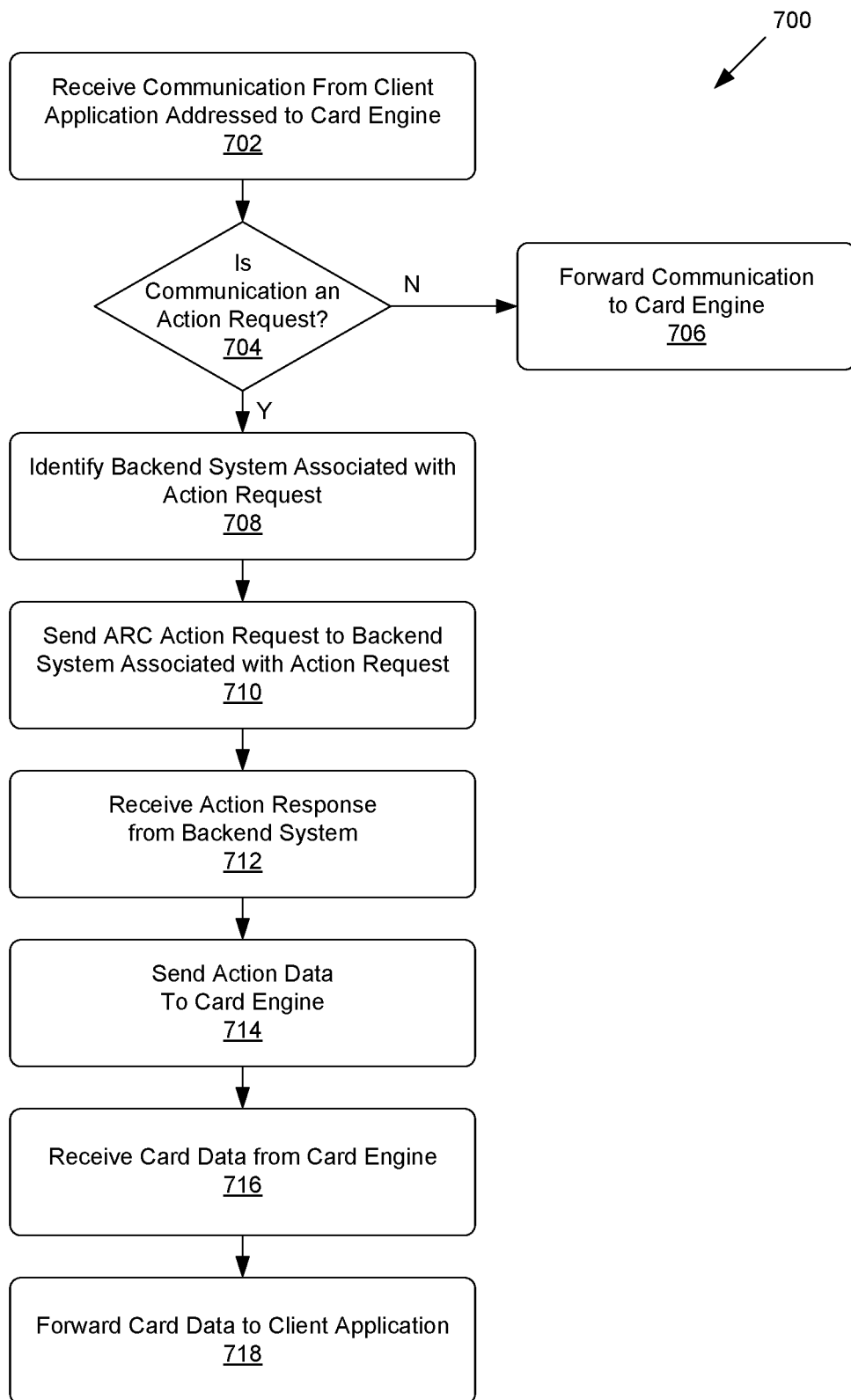
FIG. 7 shows a flowchart of an example method by which the ARC engine can provide action data associated with a backend system to the card engine.

FIG. 7 shows a flowchart of an example method 700 by which the ARC engine 118 can provide action data 126 associated with a backend system to the card engine 110.

At block 702, the ARC engine 118 can receive a communication from the client application 104. The communication can be a message addressed by the client application 104 to the card engine 110, but the ARC engine 118 can be configured to intercept such communications before they reach the card engine 110. In some examples, the communication may have passed through one or more other proxy nodes on a network path between the client application 104 and the ARC engine 118, such as an authorization proxy server configured to verify authorization and/or authentication credentials included in the communication sent by the client application 104 before routing the communication on to the ARC engine 118.

At block 704, the ARC engine 118 can determine whether the communication received at block 702 is an action request 120. For example, although the client application 104 may be configured address all outgoing communications to the card engine 110, the client application 104 may include header data or another type of backend system identifier data in the communication that indicates that the communication is associated with a backend system. For example, the communication may have originated based on a user selection of a CTA 128 on a card. The card and/or CTA 128 may be configured with card data 108 that causes the client application to include a particular header, or other backend system identifier, associated with a backend system associated with the card and/or CTA 128. At block 704, if the ARC engine 118 does not detect such a header or other backend system identifier in the communication received at block 702, the ARC engine 118 can forward the communication on to the card engine 110 at block 706. However, if at block 704 the ARC engine 118 does detect such a header or other backend system identifier in the communication, the ARC engine 118 can determine that the communication received at block 702 is an action request 120 and move to block 708.

At block 708, the ARC engine 118 can identify a particular backend system associated with the action request 120. As described above, backend systems 116 may include the payment system 130, the account management system 132, the retail system 134, and/or other background systems. The ARC engine 118 can use the header, or other backend system identifier, in the communication detected during block 704 to identify which one of a set of backend systems 116 is associated with the action request 120.

At block 710, the ARC engine 118 can send an ARC action request 122 to the backend system identified at block 708. The ARC action request 122 may request that the identified backend system perform an account action associated with a user account. The user account may be identified in the ARC action request 122 using an MSISDN, user identifier, account tokens, user credentials, and/or other credential data sent by the client application 104 as part of the action request 120.

In some examples, the ARC action request 122 may be a forwarded copy of the action request 120. In other examples, the ARC engine 118 can reformat the action request 120 into the ARC action request 122, or generate a new ARC action request 122 based on the action request 120, using an API associated with the identified backend system. In some examples, the ARC engine 118 can be configured with API data 508 for multiple backend systems, such that the ARC engine 118 can format the ARC action request 122 using particular APIs associated with any of a set of backend systems 116.

At block 712, the ARC engine 118 can receive an action response 124 from the backend system, in response to the ARC action request 122 sent at block 710. In some example, the action response 124 may indicate that the account action requested by the ARC action request 122 was performed successfully by the backend system, and/or information corresponding to the success of the account action. For instance, if the requested account action is a payment of a user's current account balance, the action response 124 may indicate that the payment was successful and/or that the user's current account balance has changed to $0 after the successful payment. In other examples, the action response 124 may indicate that the account action requested by the ARC action request 122 was not performed successfully by the backend system, and/or indicate one or more errors indicating why the account action could not be performed by the backend system. In some examples, the action response 124 may be formatted or expressed using an API associated with the identified backend system, which the ARC engine 118 may interpret using API data 508.

At block 714, the ARC engine 118 can send action data 126 to the card engine 110. The action data 126 can indicate success, failure, error data, and/or other information associated with the account action that was at least attempted by the backend system, based on the action response 124. In some examples, the ARC engine 118 can format at least some of the action data 126 as fact data 112 that the card engine 110 is configured to interpret.

In some examples, the action data 126 can include a copy of the action response 124 received by the ARC engine 118 from the backend system at block 712. In other examples, the action data 126 can include one or more facts generated by the ARC engine 118 based on the action response 124. For example, the ARC engine 118 may use an API associated with the backend system to interpret the action response 124, and include one or more facts derived from the action response 124 in the action data 126.

The action data 126 may also include a copy of the action request 120, and/or facts derived from the action request 120. In some examples, the action data 126 may also include one or more facts retrieved as fact data 112 by the ARC engine 118 from the fact controller 114 about the user's account, such that the card engine 110 can generate card data 108 based in part on such facts in the action data 126 instead of separately fetching fact data 112 from the fact controller 114 after receipt of the action data 126. However, in other examples, facts in the action data 126 may be based on the action response 124 and/or the action request 120, and the card engine 108 may fetch any other fact data 112 from the fact controller 114.

At block 716, the ARC engine 118 can receive card data 108 from the card engine 110, in response to the action data 126 sent at block 714. The ARC engine 118 can forward the card data 108 to the client application 104 at block 718, as a response to the communication from the client application 104 received at block 702.

The card engine 108 may have generated the card data 108 based on facts in the action response 124 provided by the ARC engine 118, and/or from fact data 112 retrieved by the card engine 110 from the fact controller 114. The card data 108 can at least partially reflect the completed or attempted account action performed by the backend system, based on the action data 126.

As a first example, if the backend system indicated in the action response 124 that the requested account action was successful, the ARC engine 118 can provide corresponding action data 126 to the card engine at block 714. At block 716, the card engine 110 can use success indications in the action data 126 to generate and return card data 108 that includes card content 302 expressing the success of the requested account action.

As a second example, if the backend system instead indicated in the action response 124 that the requested account action could not be performed, in some cases with additional information about an error or reason why the requested account action could not be performed, the ARC engine 118 can provide corresponding action data 126 to the card engine at block 714. Accordingly, in this example, the card engine 110 can use failure and/or error indications in the action data 126 to generate and return different card data 108 that includes different card content 302 expressing the failure of the requested account action and/or reasons why the requested account action failed.

The card data 108 provided by the card engine 110 may include card content 302 based in part on the action data 126, as well as card format data 304. In some examples, the card format data 304 can be an indicator of a particular card template stored locally by the client application 104, such that the client application 104 can fill in fields or placeholders in the local card template with elements of the card content 302, and apply formatting or layouts to the card content 302 defined in the local card template. However, in other examples, the card format data 304 can include a specific formatting or layout instructions for individual elements of the card content 302 drawn based on a server-side template. Accordingly, in these examples, the client application 104 can use the card content 302 and the card format data 304 in the card data 108 to locally render a card without using a locally-stored card template.

Figure 8:
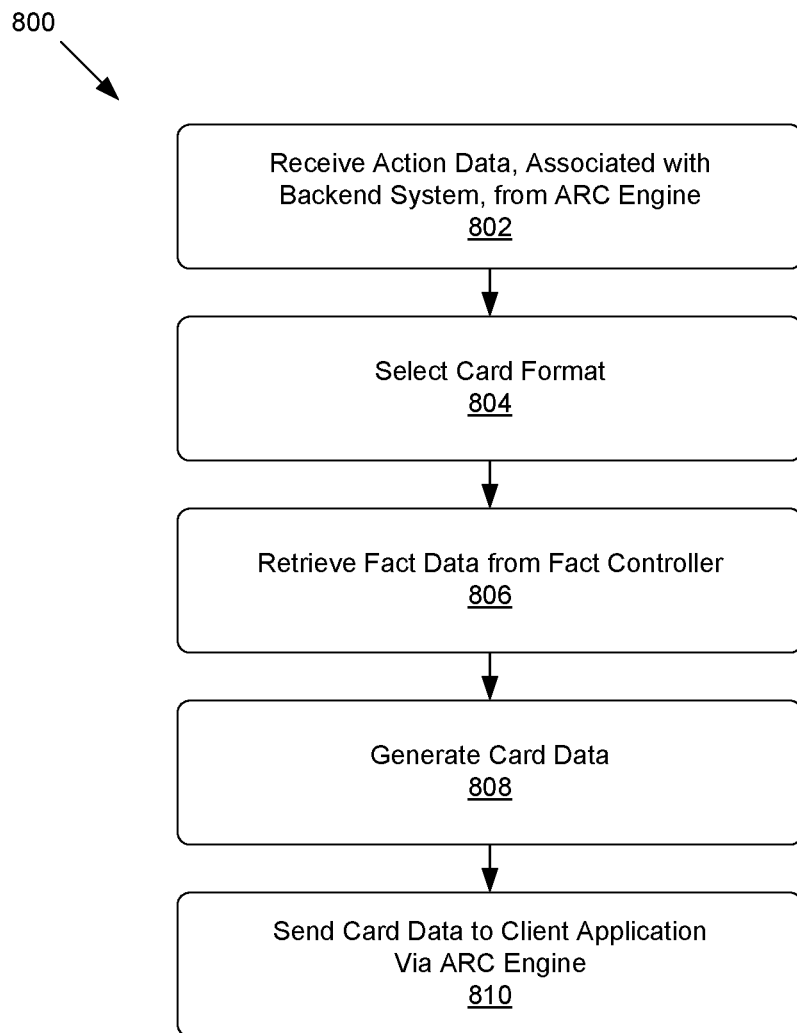
FIG. 8 shows a flowchart of an example method by which the card engine can dynamically generate card data based on action data received from the ARC engine.

FIG. 8 shows a flowchart of an example method 800 by which the card engine 110 can dynamically generate card data 108 based on action data 126 received from the ARC engine 118.

At block 802, the card engine 110 can receive action data 126 from the ARC engine 118. In some examples, the card engine 110 may be natively configured to interpret and use fact data 112 retrieved from the fact controller 114 to generate card data 108. However, the action data 126 may be formatted as fact data 112 that the card engine 110 is configured to use to generate card data 108. Accordingly, the card engine 110 can use facts or other information indicated in the action data 126 to generate card data 108.

The action data 126 can include facts and/or other indicating success, failure, error data, and/or other information associated with an account action that was at least attempted by a backend system in association with a user account. Such information may have been included in the action data 126 by the ARC engine 118, based on an action response 124 provided to the ARC engine 118 by the backend system. In some examples, the action data 126 can also include a copy of an action request 120 originally addressed by the client application 104 to the card engine 110 that was intercepted by the ARC engine 118, or one or more facts or other data derived by the ARC engine 118 from the action request 120. In some examples, the action data 126 may also include other fact data 112 that the ARC engine 118 previously retrieved from the fact controller 114 about the user account.

At block 804, the card engine 110 can select a card format, in response to receipt of the action data 126. For example, if the action data 126 indicates that a backend payment system was successfully processed, the card engine 110 can select a card format associated with a successful payment.

In some examples, the card engine 110 may select the card format based on a set of card templates that the client application 104 locally stores at the UE 102. For instance, if the card engine 110 determines that the action data 126 indicates that a backend payment system was successfully processed, the card engine 110 can identify an indicator of a local card template for successful payment situations that the client application 104 locally stores at the UE 102.

In other examples, the card engine 110 may select the card format based on a set of server-side card templates. The client application 104 may not store local copies of such server-side card templates. However, the card engine 110 may select a particular server-side template that corresponds to the action data 126. For instance, if the card engine 110 determines that the action data 126 indicates that a backend payment system was successfully processed, the card engine 110 can select a particular server-side card template that corresponds to successful payment situations.

At block 806, the card engine 110 may retrieve any other fact data 112, in addition to facts provided in the action data 126, that corresponds to fields or placeholders of the selected card format. For example, if the selected card has a label field for a user's name, and the action data 126 does not indicate the user's name, the card engine 110 can retrieve fact data 112 from the fact controller 114 that does indicate the user's name. In some examples, block 806 can be skipped, for instance if the action data 126 received at block 802 includes all of the information that corresponds to fields or placeholders of the selected card format.

In some examples, retrieving fact data 112 at block 806 can include retrieving a text string or other data that corresponds to a language preference of a user. For example, a field or placeholder of the selected card format may include a label attribute for a predefined message, such as a welcome message. In this example, the card engine 110 can use a language preference indicator in the action data 126 or in other fact data 112 to determine that the user has a Spanish language preference, and can retrieve a text string that holds a Spanish language version of the welcome message. As another example, if the action data 126 includes an English text string, derived from an action response 124 from a backend system, indicating a result of an account action attempted by the backend system, the card engine 110 can retrieve an alternate Spanish text string that corresponds to the English text string. Accordingly, although the backend system may be configured with English text strings only, the card engine 110 can prepare a corresponding Spanish text string to use in card data 108.

At block 808, the card engine 110 can generate card data 108 using information in the action data 126 received at block 802, the card format selected at block 804, and/or other fact data 112. For example, if the selected card format has one or more fields or placeholders, the card engine 110 can generate card content 302 as JSON data that includes AVPs with values for each of the fields or placeholders. The values for each of the AVPs can be selected based on corresponding information in the action data 126 and/or the fact data 112.

In examples in which the card format selected at block 804 corresponds to a local card template stored at the UE 102 by the client application 104, the card data 108 generated at block 808 can include card format data 304 that indicates a mapping identifier for the selected card format. The client application 104 can use such a mapping identifier to identify the corresponding local card template, and to format and position individual elements of the card content 302 according to the local card template.

In other examples in which the card format selected at block 806 is a server-side template, the card data 108 generated at block 808 can include card format data 304 that indicates specific formatting and/or layout instructions for each element of the card content 302, based on the selected server-side template. For example, the card engine 110 can prepare the card data 108 as JSON data that includes AVPs defining values for different fields, as well as indications of fonts, font sizes, font colors, positions, and/or other layout or formatting instructions corresponding to each of the values for each field. Such server-side templates may be added or changed by designers at the card engine 110. Because the card engine 110 can use any new or updated server-side template to generate card data 108 with card format data 304 that defines specific formatting and/or layout instructions for each element of the card content 302, the designers may not have to update the client application 104 to store corresponding local copies of such new or updated card templates.

At block 810, the card engine 110 can send the card data 108 generated at block 808 to the client application 104. Although the ARC engine 118 may be configured to intercept communications between the card engine 110 and the client application 104, the ARC engine 118 can route the card data 108 to the client application 104. The client application 104 can accordingly use the card data 108 to locally render and display a card that corresponds to the card data generated by the card engine 110. Because the card engine 110 can generate the card data 108 at least in part on action data 126 indicating a result of an account action associated with a backend system, the card data 108 can cause the client application 104 to render and display a card reflecting the result of the account action, even if neither the client application 104 nor the card engine 110 are natively configured to interface with the backend system.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
 receiving, by a card engine, action data indicating a result of an account action, associated with a user account with a service provider, that was at least attempted by a backend system associated with the service provider, wherein:
  the card engine executes on a computing device remotely from a user equipment (UE) executing a client application, the client application being configured to visually display account information associated with the user account via user interface (UI) cards based on card data provided by the card engine,
  the card engine and the client application are not compatible with an application programming interface (API) of the backend system that is configured to perform the account action, and
  the card engine receives the action data from an API Response as Card (ARC) engine that is remote from the UE, wherein:
   the ARC engine intercepts an action request sent by the client application to the card engine over a network,
   the ARC engine transmits an ARC action request to the backend system, wherein the ARC action request:
    corresponds to the action request and is based on the API of the backend system that the card engine and the client application are not compatible with, and
    causes the backend system to at least attempt to perform the account action associated with the user account,
   the ARC engine receives an action response, from the backend system based on the API of the backend system, indicating the result of the account action that was at least attempted by the backend system in response to the ARC action request, and
   the ARC engine transmits the action data to the card engine, the action data indicating the result, of the account action that was at least attempted by the backend system, in a fact data format interpretable by the card engine, instead of based on the API of the backend system that the card engine is not compatible with;
 selecting, by the card engine, a card format from among a plurality of visual card formats for UI cards to be presented via the client application, wherein the card format is selected based on the result, of the account action that was at least attempted by the backend system, indicated by the action data received by the card engine from the ARC engine;
 generating, by the card engine, a card data instance based on the card format and the action data, wherein the card data instance includes card content indicative of the result, of the account action that was at least attempted by the backend system, indicated by the action data received by the card engine from the ARC engine; and
 sending, by the card engine, the card data instance to the client application over the network,
 wherein the card data instance causes the client application to render and display, in a UI of the client application, a corresponding UI card that visually presents the card content, indicative of the result of the account action that was at least attempted by the backend system, based on the card format selected by the card engine.

2. The method of claim 1, further comprising retrieving, by the card engine from a fact controller, fact data associated with the card format.

3. The method of claim 1, wherein the card data instance further includes a mapping identifier of a local card template stored by the client application that corresponds to the card format selected by the card engine.

4. The method of claim 1, wherein:
 the card format is a server-side card template stored by the card engine, and
 the card data instance further includes, based on the server-side card template, one or more of format attributes and layout attributes associated with one or more elements of the card content.

5. The method of claim 1, wherein the card engine sends the card data instance to the client application via the ARC engine.

6. The method of claim 1, further comprising determining, by the card engine, one or more values for one or more attributes of the card content, indicative of to the result of the account action that was at least attempted by the backend system, based on a language preference associated with the user account.

7. The method of claim 1, wherein the backend system is one of a set of backend systems associated with the ARC engine.

8. The method of claim 7, wherein the set of backend systems comprises one or more of a billing system, an account management system, or a retail system.

9. The method of claim 7, wherein the ARC engine is configured to identify the backend system, from among the set of backend systems, based on a backend system identifier in the action request sent by the client application.

10. A network element, comprising:
 one or more processors; and memory storing computer-executable instructions associated with a card engine that is not compatible with an application programming interface (API) of a backend system associated with a service provider, wherein the computer-executable instructions, when executed by the one or more processors, cause the one or more processors to perform operations comprising:

receiving, by the card engine from an API Response as Card (ARC) engine, action data indicating a result of an account action, associated with a user account with the service provider, that was at least attempted by the backend system, wherein:

the ARC engine intercepts an action request sent over a network to the card engine from a client application that:

is not compatible with the API of the backend system, executes on a user equipment (UE) remotely from the card engine and the ARC engine, and is configured to visually display account information associated with the user account via user interface (UI) cards based on card data provided by the card engine, the ARC engine transmits an ARC action request to the backend system, wherein the ARC action request:

corresponds to the action request and is based on the API of the backend system that the card engine and the client application are not compatible with, and causes the backend system to at least attempt to perform the account action associated with the user account, the ARC engine receives an action response, from the backend system based on the API of the backend system, indicating the result of the account action that was at least attempted by the backend system in response to the ARC action request, and the ARC engine transmits the action data to the card engine, the action data indicating the result, of the account action that was at least attempted by the backend system, in a fact data format interpretable by the card engine, instead of based on the API of the backend system that the card engine is not compatible with;

selecting, by the card engine, a card format from among a plurality of visual card formats for UI cards to be presented via the client application, wherein the card format is selected based on the result, of the account action that was at least attempted by the backend system, indicated by the action data received by the card engine from the ARC engine;

generating, by the card engine, a card data instance based on the card format and the action data, wherein the card data instance includes card content indicative of the result, of the account action that was at least attempted by the backend system, indicated by the action data received by the card engine from the ARC engine; and sending, by the card engine, the card data instance to the client application over the network, wherein the card data instance causes the client application to render and display, in a UI of the client application, a corresponding UI card that visually presents the card content, indicative of the result of the account action that was at least attempted by the backend system, based on the card format selected by the card engine.

11. The network element of claim 10, wherein the operations further comprise retrieving, by the card engine from a fact controller, fact data associated with the card format.

12. The network element of claim 10, wherein the card data instance further includes a mapping identifier of a local card template stored by the client application that corresponds to the card format selected by the card engine.

13. The network element of claim 10, wherein:

the card format is a server-side card template stored by the network element in association with the card engine, and the card data instance further includes, based on the server-side card template, one or more of format attributes and layout attributes associated with one or more elements of the card content.

14. The network element of claim 10, wherein the operations further comprise determining, by the card engine, one or more values for one or more attributes of the card content, indicative of the result of the account action that was at least attempted by the backend system, based on a language preference associated with the user account.

15. The network element of claim 10, wherein the backend system is one of a set of backend systems associated with the ARC engine.

16. One or more non-transitory computer-readable media storing computer-executable instructions associated with a card engine that is not compatible with an application programming interface (API) of a backend system associated with a service provider, wherein the computer-executable instructions, when executed by one or more processors of a network element, cause the one or more processors to perform operations comprising:

receiving, by the card engine from an API Response as Card (ARC) engine, action data indicating a result of an account action, associated with a user account with the service provider, that was at least attempted by the backend system, wherein:

the ARC engine intercepts an action request sent over a network to the card engine from a client application that:

is not compatible with the API of the backend system, executes on a user equipment (UE) remotely from the card engine and the ARC engine, and is configured to visually display account information associated with the user account via user interface (UI) cards based on card data provided by the card engine, the ARC engine transmits an ARC action request to the backend system, wherein the ARC action request:

corresponds to the action request and is based on the API of the backend system that the card engine and the client application are not compatible with, and causes the backend system to at least attempt to perform the account action associated with the user account, the ARC engine receives an action response, from the backend system based on the API of the backend system, indicating the result of the account action that was at least attempted by the backend system in response to the ARC action request, and the ARC engine transmits the action data to the card engine, the action data indicating the result, of the account action that was at least attempted by the backend system, in a fact data format interpretable by the card engine, instead of based on the API of the backend system that the card engine is not compatible with;

selecting, by the card engine, a card format from among a plurality of visual card formats for UI cards to be presented via the client application, wherein the card format is selected based on the result, of the account action that was at least attempted by the backend system, indicated by the action data received by the card engine from the ARC engine;

generating, by the card engine, a card data instance based on the card format and the action data, wherein the card data instance includes card content indicative of the result, of the account action that was at least attempted by the backend system, indicated by the action data received by the card engine from the ARC engine; and sending, by the card engine, the card data instance to the client application over the network, wherein the card data instance causes the client application to render and display, in a UI of the client application, a corresponding UI card that visually presents the card content, indicative of the result of the account action that was at least attempted by the backend system, based on the card format selected by the card engine.

17. The one or more non-transitory computer-readable media of claim 16, wherein the operations further comprise retrieving, by the card engine from a fact controller, fact data associated with the card format.

18. The one or more non-transitory computer-readable media of claim 16, wherein the card data instance further includes a mapping identifier of a local card template stored by the client application that corresponds to the card format selected by the card engine.

19. The one or more non-transitory computer-readable media of claim 16, wherein:
   the card format is a server-side card template stored by the network element in association with the card engine, and
   the card data instance further includes, based on the server-side card template, one or more of format attributes and layout attributes associated with one or more elements of the card content.

20. The one or more non-transitory computer-readable media of claim 16, wherein the operations further comprise determining, by the card engine, one or more values for one or more attributes of the card content, indictive of the result of the account action that was at least attempted by the backend system, based on a language preference associated with the user account.

* * * * *